United States Patent
Stadler et al.

[11] 3,846,433
[45] Nov. 5, 1974

[54] PROCESS FOR PREPARING ERGOT ALKALOIDS

[75] Inventors: Paul Stadler, Biel-Benken/BL; Peter Stutz, Basel; Stephan Guttmann, Allschwill, all of Switzerland

[73] Assignee: Sandoz Ltd. (aka Sandoz AG), Basel, Switzerland

[22] Filed: July 19, 1972

[21] Appl. No.: 273,113

Related U.S. Application Data

[63] Continuation-in-part of Ser. No. 33,526, April 30, 1970, abandoned.

[30] Foreign Application Priority Data
May 6, 1969 Switzerland.......................... 6912/69
July 2, 1969 Switzerland...................... 10118/69

[52] U.S. Cl....... 260/285.5, 260/112.5, 260/268 PE
[51] Int. Cl. C07d 43/20, C07d 51/64, C07c 103/52
[58] Field of Search......... 260/285.5, 112.5, 268 PE

[56] References Cited
UNITED STATES PATENTS

| | | | |
|---|---|---|---|
| 2,736,728 | 2/1956 | Pioch ........................... | 260/268 PE |
| 2,997,470 | 8/1961 | Pioch ........................... | 260/268 PE |
| 3,113,133 | 12/1963 | Hofmann et al. ............. | 260/268 PE |
| 3,336,311 | 8/1967 | Hofmann et al. ............... | 260/285.5 |
| 3,592,816 | 7/1971 | Troxler et al. ................... | 260/285.5 |
| 3,652,569 | 3/1972 | Stadler et al. ....... | 260/268 PE;285.5 |
| 3,666,762 | 5/1972 | Guttmann et al............... | 260/285.5 |
| 3,681,355 | 8/1972 | Guttmann et al............. | 260/268 PE |

OTHER PUBLICATIONS
Fieser and Fieser, "Reagents for Organic Synthesis," vol. 1, Wiley and Sons, NY (1967), p. 1222.

*Primary Examiner*—Lewis Gotts
*Assistant Examiner*—Reginald J. Suyat
*Attorney, Agent, or Firm*—Gerald D. Sharkin; Robert S. Honor; Thomas O. McGovern

[57] ABSTRACT

The invention concerns a process for the production of a lysergic acid polypeptide derivative of the formula:

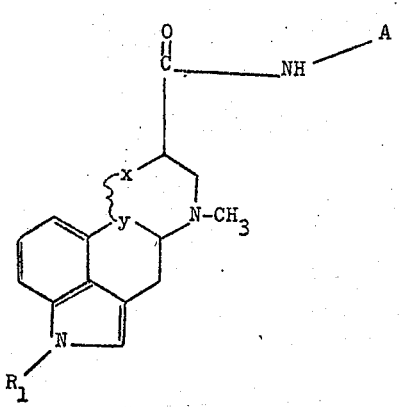

wherein $\overset{\frown}{x\,y}$ is the group

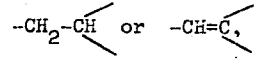

$R_1$ is hydrogen, lower alkyl, allyl, or benzyl, and —NH—A is a polypeptide with cyclic structure known in ergot peptide alkaloids.

14 Claims, No Drawings

PROCESS FOR PREPARING ERGOT ALKALOIDS

This application is a continuation-in-part of U.S. Pat. application Ser. No. 33,526, filed Apr. 30, 1970, now abandoned.

The present invention relates to a new process for the production of compounds of formula I,

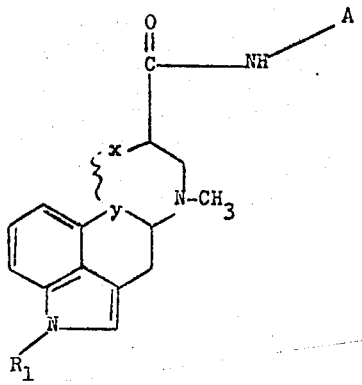

in which $\overbrace{x\ y}$ signifies the group

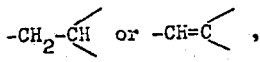

$R_1$ signifies hydrogen, lower alkyl, i.e., alkyl having 1 to 4 carbon atoms, e.g., methyl, ethyl, isopropyl, and the like, allyl or benzyl and —NH—A signifies a polypeptide with cyclic structure known in ergot peptide alkaloids.

Examples of peptide-like ergot alkaloids of formula I are the compounds produced in the Examples 1 to 10 and also 9,10-dihydroergostine, 9,10-dihydroergovaline, 9,10-dihydroergonine and ergoptine. The polypeptides contemplated normally have the general formula:

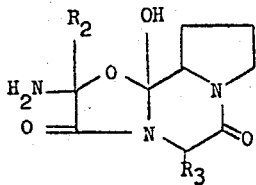

where
$R_2$ is hydrogen or lower alkyl as defined above and
$R_3$ is lower alkyl as defined above or benzyl.

In accordance with the invention, a compound of formula I is prepared:
a. by reacting in an inert solvent a lysergic acid compound of formula (III)

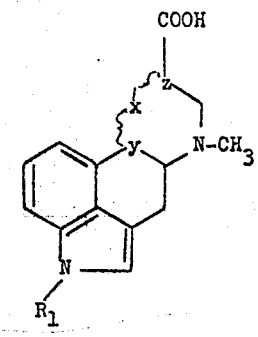

in which $R_1$ is as defined previously, and $\overbrace{z\ x\ y}$ signifies the group

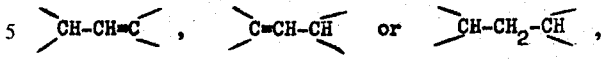

with trifluoroacetic acid anhydride, in the presence of 1 to 5 moles of trifluoroacetic acid per mole of lysergic acid compound which dissolves the lysergic acid compound in the inert solvent, and b. reacting the resulting mixed anhydride with a salt of an amine of formula II, $$H-NH-A \quad II$$

where —NH—A is as defined above,
in the presence of a tertiary organic base which liberates the amine base from the amine salt,
each stage of the reaction being carried out at a temperature of between −20° and −10°C.

One preferred method of effecting the process of the invention consists in that a mixture of 1-$R_1$-lysergic acids, 1-$R_1$-isolysergic acids and 1-$R_1$-6-methyl-$\Delta^{8,9}$-ergolene-8-carboxylic acids, where $R_1$ is as defined above, is used as the compound of formula III; and the compound of formula I in which $\overbrace{x\ y}$ is

is obtained.

The process of the present invention may be carried out by adding 1 to 5 moles of free trifluoroacetic acid per mole of lysergic acid compound at the beginning of the reaction to dissolve the lysergic acid in the inert solvent. Alternatively the free trifluoroacetic acid may be generated "in situ" from excess trifluoroacetic acid anhydride by the addition of water to the reaction mixture, for example, as water of hydration in the lysergic acid compound of formula III. For the production in accordance with the invention of the mixed anhydrides of compounds of formula III using free trifluoroacetic acid, the relationship of the starting materials is chosen such that preferably 1 to 1.4 mols of trifluoroacetic acid anhydride and 2 mols of trifluoroacetic acid, calculated on 1 mol of the anhydrous compound of formula III, are used. Where the free trifluoroacetic acid is generated in situ it is preferred that 2 to 2.4 mols of trifluoroacetic acid anhydride, calculated on 1 mol of the monohydrate of a compound of formula III, be used. In case the water content of the compounds of formula III diverges from that of the monohydrate or the anhydrous form, the amounts of trifluoroacetic acid anhydride and trifluoroacetic acid used are varied accordingly. Thus, in the preferred reaction, about 3 mols of trifluoroacetic acid are ultimately formed for every mol of the mixed anhydride of the compounds of formula III with trifluoroacetic acid.

When a compound of formula III, in which $\overbrace{z\ x\ y}$ signifies the group

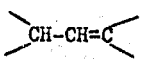

and $R_1$ has the above significance, is used as starting material, the compound is advantageously used as a hydrate; as considerable losses of material occur upon drying these carboxylic acids because of their likelihood to decompose.

Compounds of formula III, in which $\overline{z\,x\,y}$ signifies the group

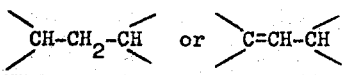

and $R_1$ has the above significance, may be easily converted into anhydrous form by heating to a maximum temperature of 150°C in vacuum. This is surprisingly also the case with mixtures of 1-$R_1$-lysergic acids, 1-$R_1$-isolysergic acids and 1-$R_1$-6-methyl-$\Delta^{8,9}$-ergolene-8-carboxylic acids, which are also preferably used in anhydrous form.

Examples of suitable solvents or solvent mixtures which are inert under the reaction conditions are acetonitrile, dimethyl formamide, dimethyl acetamide, propionitrile, N-methyl pyrrolidone, and methylene chloride.

The sequence of the addition of the reagents for the production of the mixed anhydrides is exchangeable. Thus, for example, the compounds of formula III in anhydrous form may be suspended in one of the organic solvents mentioned above and dissolved by the addition of 1 to 5 mols, preferably about 2 mols of trifluoroacetic acid per mole of lysergic acid compound, whereupon 1 to 1.4 moles of trifluoroacetic acid anhydride is added. Alternately both reagents may be added dropwise to a suspension of the compounds of formula III in an inert solvent. It is furthermore possible to reverse the sequence of the addition of trifluoroacetic acid and trifluoroacetic acid anhydride in the above.

Since the resulting mixed anhydride of the compound of formula III with trifluoroacetic acid is likely to decompose, it is immediately used in solution for the subsequent reactions. A compound of formula II in the form of its salt, e.g., as hydrochloride, is immediately added to this solution of the mixed anhydrides, it being recommendable to use a relationship of 1 mol of a salt of a compound of formula II and 1.3 to 2 mols of the mixed anhydride of trifluoroacetic acid with the compounds of formula III for the obtention of the highest yields.

The base of formula II is liberated by the addition of a large excess of a tertiary organic base at −20° to −10°C, to the reaction mixture. The tertiary organic base used in the reaction can be any of the tertiary organic basis capable of freeing an amine base from its salts, e.g., triethylamine, pyridine, and the like, especially pyridine. The amine base reacts spontaneously with the mixed anhydride of trifluoroacetic acid with the compounds of formula III. If desired, the sequence of the addition of the base and the compounds of formula II in the form of their salts may be exchanged. The reaction concludes rapidly, but it is advantageous to maintain the reaction mixture at a temperature range of between −15° to 0°C for a further 15 to 100 minutes after all reactants have been added.

The compounds of formula I are thus obtained in a practically quantitative yield and with such a high degree of purity that a chromatographic purification of the final products of the process is generally unnecessary. Furthermore, the well-known disadvantages of the conventional processes are eliminated. In the known methods for the production of acid chloride hydrochlorides of the lysergic acid series, it is necessary to use a large excess of pure phosphorus trichloride or phosphorus pentachloride, the destruction or removal of which causes considerable difficulty. In addition, the acid chloride hydrochlorides of the lysergic acid series can only be handled on a technical scale with difficulty due to their extreme hygroscopicity and their tendency to decompose. In accordance with the process of the present invention such disadvantages are eliminated and the synthesis of ergot peptide alkaloids is improved, simplified and shortened.

The ergot peptide alkaloids have well known uses and can be used in known manner, for example, in the treatment of migraine, cerebral and peripheral blood flow disorders and the like. Compounds I, not specifically known in the practice, may be used in similar manner, at similar dosage levels.

The use of compounds of formula III in the form of a mixture of lysergic acid, isolysergic acid and 6-methyl-$\Delta^{8,9}$-ergolene-carboxylic acid as starting material is especially advantageous in that the single product, ergotamine, is readily obtained. This mixture may be obtained directly by saprophytic cultivation of the fungus strain NRRL 3080 of the species Claviceps paspali Stevens et Hall. The facts indicated above show that the process of the invention permits the production of the pharmacologically highly effective compounds of formula I, e.g. the alkaloids of the ergotamine and the ergotoxin group, using technically readily obtainable starting materials which are considerably more economical than those hitherto used. This results in a considerable reduction of the production costs for the products of the process of the present invention.

In the following non-limitative Examples all temperatures are indicated in degrees Centigrade and are corrected.

EXAMPLE 1

Ergotamine and ergotaminine.

3.72 g (13 millimols) of d-lysergic acid monohydrate are suspended in 20 cc of absolute acetonitrile and cooled to −20° with stirring. A solution of 5.46 g (26 millimols) of trifluoroacetic acid anhydride in 20 cc of absolute acetonitrile is subsequently added dropwise at such a rate that the temperature does not exceed −20°. After stirring at −20° for 10 minutes 3.68 g (10 millimols) of (2R,5S,10aS,10bS)-2-amino-5-benzyl-3,6-dioxo-10b-hydroxy-2-methyloctahydro-8H-oxazolo[3,2-a]pyrrolo[2,1-c]pyrazine hydrochloride are added to the clear solution, and 20 cc of absolute pyridine are immediately added dropwise to the resulting suspension at such a rate that the temperature does not exceed −10°. After stirring at −10° to 0° for 1 hour, the reaction mixture is poured into 500 cc of methylene chloride, is covered with a layer of 100 cc of a 2 N sodium carbonate solution and is thoroughly shaken. The aqueous phase is separated, is again extracted 4 times with 100 cc amounts of methylene chloride, the combined organic phases are washed with 50 cc of a 2 N sodium carbonate solution and are dried over 20 g of sodium sulphate and 2 g of active charcoal with stirring. After removing the solvent by distillation at 15 mm of Hg, the last remnant of pyridine is removed by the addition of 2 times 200 cc of toluene and subsequent removal by distillation. The residue obtained as light ocre coloured powder is crystallized from 50 cc of methanol, whereby pure crystalline ergotaminine, having a M.P. of 236°–237° (decomp.), is obtained. $[\alpha]_D^{20} = +375°$ (c = 0.5 in chloroform).

The mother liquor is evaporated to dryness and ergotamine is crystallized as difficultly soluble sulphate by taking up in a mixture of 40 cc of methanol and 7 cc of glacial acetic acid with the addition of 0.25 g of sulphuric acid in a small amount of methanol. After allowing the mixture to stand in a refrigerator for 2 hours, a precipitate of brown, brilliant crystals, having a M.P. of 201°–203°, is obtained; this precipitate is shaken out between 5 percent aqueous ammonia and chloroform, and after drying over sodium sulphate and active charcoal, adding the theoretic amount of d-tartaric acid in methanol and subsequently concentrating, directly yields an almost clear white ergotamine tartrate without further purification.

The mother liquor of the ergotamine sulphate crystallization is concentrated by evaporation in a vacuum and worked up to a base as described above. Chromatography on a 30-fold quantity of aluminium oxide, activity I, and elution with methylene chloride yield a further amount of pure ergotaminine, and elution with methylene chloride containing 0.5 percent of methanol yields a further amount of ergotamine. Ergotaminine may be rearranged to ergotamine sulphate by dissolving in a twofold quantity of glacial acetic acid and adding the theoretic amount of sulphuric acid in a 10-fold quantity of methanol by simply allowing to stand at room temperature, whereby the yield of pure ergotamine tartrate is accordingly increased.

EXAMPLE 2

Ergotamine and ergotaminine.

10.7 g (40 millimols) of an anhydrous mixture of 40 percent of 6-methyl-$\Delta^{8,9}$-ergolene-8-carboxylic acid, 40 percent of lysergic acid and 20 percent of isolysergic acid are suspended in 40 cc of absolute dimethyl formamide and dissolved by the addition of 9.12 g (80 millimols) of trifluoroacetic acid with stirring. This solution is cooled to −20°, 10.08 g (48 millimols) of trifluoroacetic acid anhydride in 40 cc of absolute acetonitrile are added dropwise at such a rate that the temperature does not exceed −15°, and the mixture is subsequently stirred at this temperature for 10 minutes. 7.36 g (20 millimols) of (2R,5S,10aS,10bS)-2-amino-5-benzyl-3,6-dioxo-10b-hydroxy-2-methyloctahydro-8H-oxazolo[3,2-a]pyrrolo[2,1-c]pyrazine hydrochloride are subsequently added, and 40 cc of absolute pyridine are rapidly added dropwise at such a rate that the temperature does not exceed −10°. After stirring at a temperature between −10° and 0° for 1½ hours, the reaction is complete. The reaction mixture is poured into 1 liter of methylene chloride, is shaken out with 200 cc of a 2 N soda solution and further worked up as described in Example 1. In this manner whitish ergotaminine, having a M.P. of 234° (decomp.), and light brown, brillant ergotamine sulphate, having a M.P. of 203° (decomp.), are obtained. Ergotaminine is converted into ergotamine sulphate as described in Example 1.

EXAMPLE 3

Ergostine.

Ergostine is obtained in accordance with the process described in Example 2, using 10.7 g (40 millimols) of an anhydrous mixture of 40 percent of 6-methyl-$\Delta^{8,9}$-ergolene-8-carboxylic acid, 40 percent of lysergic acid and 20 percent of isolysergic acid, 9.12 g (80 millimols) of trifluoroacetic acid, 10.08 g (48 millimols) of trifluoroacetic acid anhydride, as well as 11.12 g (20 millimols) of (2R,5S,10aS,10bS)-2-amino-2-ethyl-5-benzyl-3,6-dioxo-10b-hyxyoctahydro-8H-oxazolo[3,2-a]pyrrolo[2,1-c]pyrazine hydrochloride . 2 dioxane.

EXAMPLE 4

Ergocristine.

Ergocristine is obtained in accordance with the process described in Example 2, using 10.7 g (40 millimols) of an anhydrous mixture of 40 percent of 6-methyl-$\Delta^{8,9}$-ergolene-8-carboxylic acid, 40 percent of lysergic acid and 20 percent of isolysergic acid, 9.12 g (80 millimols) of trifluoroacetic acid and 10.08 g (48 millimols) of trifluoroacetic acid anhydride, as well as 9.4 g (20 millimols) of (2R,5S,10aS,10bS)-2-amino-5-benzyl-3 , 6-dioxo-10b-hydroxy-2-isoproyloctahydro-8H-oxazolo[3,2-a]pyrrolo[2,1-c]pyrazine hydrochloride . dimethyl formamide.

EXAMPLE 5

Ergovaline.

Ergovaline is obtained in accordance with the process described in Example 2, using 10.7 g (40 millimols) of an anhydrous mixture of 40 percent of 6-methyl-$\Delta^{8,9}$-ergolene-8-carboxylic acid, 40 percent of lysergic acid and 20 percent of isolysergic acid, 9.12 g (80 millimols) of trifluoroacetic acid, 10.08 g (48 millimols) of trifluoroacetic acid anhydride, as well as 6.4 g (20 millimols) of (2R, 5S, 10as, 10bs) of 2-amino-2-methyl-5-isopropyl-10b-hydroxy-3,6-dioxo-octahydrooxazolo[3,2-a]-pyrrolo[2,1-c]pyrazine hydrochloride.

Ergocornine, ergocryptine and ergonine may be produced in analogous manner in accordance with the processes described in Examples 2 to 5.

EXAMPLE 6

9,10-Dihydroergotamine.

2.05 g (7.5 millimols) of 9,10-dihydrolysergic acid having a water content of 0.2 molar equivalents are suspended in 20 cc of absolute dimethyl formamide, and dissolved by the addition of 1.72 g (15 millimols) of trifluoroacetic acid and cooled to −10° with stirring. 2.10 g (10 millimols) of trifluoroacetic acid anhydride are added dropwise, 2.3 cc of absolute pyridine are subsequently added, and the reaction mixture is stirred at −10° for a further 15 minutes. The mixture is subsequently again cooled to −15°, 1.84 g (5 millimols) of (2R,5S,10aS,10bS)-2-amino-5-benzyl-3,6-dioxo-10b-hydroxy-2-methyl-octahydro-8H-oxazolo[3,2-a]pyrrolo[2,1-c]pyrazine hydrochloride are added, 10 cc of absolute pyridine are immediately added dropwise to the resulting suspension, and the mixture is allowed to react at a temperature between −10° and 0° for 1 hour. The reaction mixture is poured on ice-cooled 5 percent aqueous ammonia and extracted thrice with 500 cc amounts of methylene chloride. After drying the combined organic phases over sodium sulphate with the addition of active charcoal, the solvent is carefully removed by distillation in a vacuum, and the light yellow crude base, obtained in the form of a foam, is taken up in 15 cc of aqueous acetone, whereupon 9,10-dihydroergotamine is immediately obtained as an acetone crystallization product in the form of light yellow, brilliant prisms containing water of crystallization. The solvent of crystallization is removed by drying in a high vacuum at 80°, whereby thin layer chromatographically pure 9,10-dihydroergotamine, having a M.P. of 235° (decomp.), $[\alpha]_D^{20} = -63°$ (c = 0.5 in pyridine), is obtained. A further amount of 9,10-dihydroergotamine may be eluted from the mother liquor by chromatography on a 50-fold quantity of aluminium oxide, activity I, with methylene chloride containing 0.5 percent of methanol.

EXAMPLE 7

Ergostine.

10.75 g (37.5 millimols) of d-lysergic acid monohydrate are dissolved in 500 cc of absolute acetonitrile and cooled to −20° with stirring. 15.8 g (75 millimols) of trifluoroacetic acid anhydride are then rapidly added dropwise, the resulting clear solution is stirred at −20° for 5 minutes, and 13.9 g (25 millimols) of (2R,5S,10aS,10bS)-2-amino-2-ethyl-5-benzyl-3,6-dioxo-10b-hydroxyoctahydro-8H-oxazolo[3,2-a]pyrrolo[2,1-c]pyrazine hydrochloride containing 2 mols of dioxane of crystallization are added at −15°. 50 cc of absolute pyridine are then added dropwise at such a rate that the temperature does not exceed −10°, and the resulting clear solution is kept at a temperature between −10° and 0° for 1 hour. Working up is effected by pouring the reaction mixture into 1 liter of methylene chloride, covering with a layer of 300 cc of 2 N sodium carbonate solution, shaking and extracting thrice with 500 cc amounts of methylene chloride.

The combined organic phases are dried over sodium sulphate with the addition of active charcoal, and the solvent is carefully removed in a vacuum. A yellow-brown foam is obtained, which is chromatographed on a 15-fold quantity of aluminium oxide, activity I. Elution with methylene chloride yields a mixture of ergostine and ergostinine, which is dissolved in ethanol with the addition of a small amount of glacial acetic acid, and something more than the theoretic amount of maleic acid is added to the solution. After standing at room temperature for 3 days, concentrating the reaction mixture in a vacuum and filtration, a whitish, crystalline ergostine bimaleate, having a M.P. of 174-175° (decomp.), $[\alpha]_D^{20} = +87°$ (c = 1 in water/ethanol 1:1), is obtained. An additional amount of ergostine may be obtained in the form of a yellowish foam from the filtrate by evaporating to dryness, dividing between methylene chloride and a 2 N sodium carbonate solution, and chromatography of the crude base obtained after drying and distilling off the organic phase, on a 30-fold quantity of aluminium oxide, activity I, using methylene chloride as eluant; this ergostine may be converted into the bimaleate in analogous manner.

EXAMPLE 8

9,10-Dihydroergocristine 8.2 g (30 millimols) of 9,10-dihydrolysergic acid, having a water content of 0.3 molar equivalents are suspended in 200 cc of anhydrous acetonitrile, and dissolved by the addition of 6.88 g (60 millimols) of trifluoroacetic acid and cooled to −15° with stirring. 8.4 g (40 millimols) of trifluoroacetic acid anhydride are added dropwise, 20 cc of absolute pyridine are subsequently added and the reaction mixture is stirred at −10° for a further 15 minutes. The mixture is again cooled to −15°, and 9.4 g (20 millimols) of (2R, 5S, 10aS, 10bS)-2-amino-5-benzyl-3,6-dioxo-10b-hydroxy-2-isopropyl-octahydro-8H-oxazolo[3,2-a]pyrrolo[2,1-c]pyrazine hydrochloride are added and 40 cc of absolute pyridine are immediately added dropwise to the resulting suspension. The reaction mixture is stirred at a temperature between −10° and 0° for 1 hour, 20 cc of water are added, and the mixture is dried at reduced pressure. The residue is dissolved in a mixture of 200 cc of methylene chloride/methanol (8:2) and 50 cc of 1 N hydrochloric acid, the phases are separated, the organic phase is washed twice with 50 cc amounts of 1 N hydrochloric acid, the combined aqueous phases are extracted four times with 50 cc amounts of methylene chloride/methanol (8:2), the combined organic phases are washed with 100 cc of a 4 N soda solution, dried over sodium sulphate and evaporated to dryness. The residue is dissolved in 50 cc of hot acetone and allowed to crystallize at 0°. After filtration and drying, 9,10-dihydroergocristine, having a M.P. of 182° (decomp.), $[\alpha]_D^{20} = -53°$ (c = 1 in pyridine), is obtained.

EXAMPLE 9

9,10-Dihydroergocryptine 4.1 g (15 millimols) of 9,10-dihydrolysergic acid, having a water content of 0.3 molar equivalents are suspended in 120 cc of anhydrous acetonitrile, and dissolved by the addition of 1.72 g (15 millimols) of trifluoroacetic acid and cooled to −15° with stirring. 4.2 g (20 millimols) of trifluoroacetic acid anhydride are added dropwise, 5 cc of absolute pyridine are subsequently added and the reaction mixture is stirred at −10° for a further 15 minutes. The mixture is again cooled to −15°, and 4.2 g (10 millimols) of (2R, 5S, 10aS, 10bS)-2-amino-3,6-dioxo-10b-hydroxy-2-isopropyl-5-(2-methylpropyl-1)-octahydro-8H-oxazolo[3,2-a]pyrrolo[2,1-c]pyrazine hydrochloride are added and 20 cc of absolute pyridine are immediately added dropwise to the resulting suspension. The reaction mixture is stirred at a temperature between −10° and 0° for 1 hour, and the mixture is dried at 30° and reduced pressure. The residue is dissolved in a mixture of 100 cc of methylene chloride/methanol (8:2) and 20 cc of a 4 N sodium carbonate solution, and the phases are separated. The organic phase is washed thrice with 20 cc amounts of a 4 N sodium carbonate solution, and the combined aqueous phases are extracted 4 times with 50 cc amounts of methylene chloride/methanol (8:2). The combined organic phases are dried over sodium sulphate and animal charcoal and are evaporated to dryness. The residue is dissolved in 20 cc of hot ethanol, ether is added until a turbidity results, and the solution is allowed to crystallize. The resulting 9,10-dihydroergocryptine has a M.P. of 236° (decomp.). $[\alpha]_D^{20} = -41°$ (c = 1 in pyridine).

EXAMPLE 10

9,10-Dihydroergocornine 4.1 g (15 millimols) of 9,10-dihydrolysergic acid, having a water content of 0.3 molar equivalents are suspended in 120 cc of anhydrous acetonitrile, and dissolved by the addition of 3.44 g (30 millimols) of trifluoroacetic acid and cooled to −15° with stirring. 4.2 g (20 millimols) of trifluoroacetic acid anhydride are added dropwise, 10 cc of absolute pyridine are subsequently added and the reaction mixture is stirred at −10° for a further 15 minutes. The mixture is again cooled to −15°, and 4.2 g (10 millimols) of (2R,5-,10aS,10bS)-2-amino-3,6-dioxo-10b-hydroxy-2,5-diisopropyl-octahydro-8H-oxazolo[3,2-a]pyrrolo[2,1-c]pyrazine hydrochloride are added and 20 cc of absolute pyridine are immediately added dropwise to the resulting suspension. The reaction mixture is stirred at a temperature between −10° and 0° for 1 hour. 10 cc of a 4 N sodium carbonate solution are then added and the solution is evaporated to dryness at 30° and reduced pressure. The residue is dissolved in a mixture of 100 cc of methylene chloride/methanol (8:2) and 20 cc of a 4 N sodium carbonate solution, the phases are separated, the organic phase is washed thrice with 20 cc amounts of a 4 N sodium carbonate solution, the combined aqueous phases are extracted 4 times with 50 cc amounts of methylene chloride/methanol (8:2), and the combined organic phases are dried over sodium sulphate and animal charcoal and evaporated to dryness. The residue is dissolved in 20 cc of hot ethanol, ether is added to the solution until it starts to turn turbid, and the solution is allowed to crystallize. The resulting 9,10-dihydroergocornine has a M.P. of 185° (decomp.). $[\alpha]_D^{20} = -47°$ (c = 1 in pyridine).

What is claimed is:

1. A process for the preparation of a lysergic acid polypeptide compound of the formula

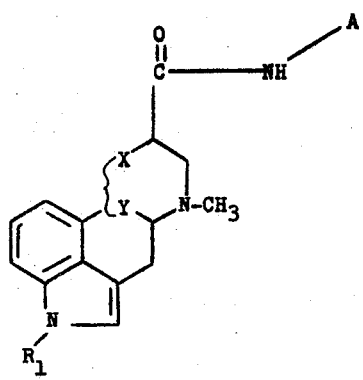

wherein $\overline{x\ y}$ is the group

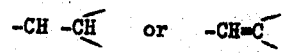

$R_1$ is hydrogen, lower alkyl, allyl, or benzyl, and -NH-A is a polypeptide with cyclic structure known in ergot peptide alkaloids, which comprises the steps:

a. reacting in an inert solvent a lysergic acid compound of the formula:

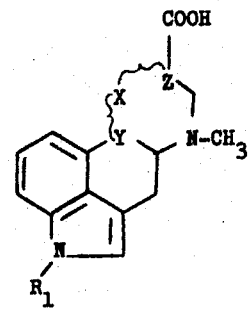

where $R_1$ is as defined above, and $\overline{z\ x\ y}$ is the group

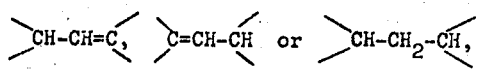

with trifluoroacetic anhydride and b. reacting the resulting mixed anhydride in inert solvent with a salt of an amine of the formula

wherein —NH—A is as defined above, in the presence of a tertiary organic base which liberates the amine base from the amine salt, each stage of the reaction being carried out at a temperature of between −20° and −10°C, the improvement which comprises carrying out step a) in the presence of 1 to 5 moles of trifluoroacetic acid per mole of lysergic acid compound to dissolve the lysergic acid compound in the inert solvent.

2. A process according to claim 1 in which the lysergic acid compound comprises a mixture of 1-$R_1$-lysergic acid, 1-$R_1$-isolysergic acid and 1-$R_1$-6-methyl-$\Delta^{8,9}$-ergolene-8-carboxylic acid, wherein $R_1$ is as defined in claim 1.

3. A process according to claim 1 in which the trifluoroacetic acid which dissolves the lysergic compound in the inert solvent is added in the form of free trifluoroacetic acid at the beginning of the reaction.

4. A process according to claim 3, in which the lysergic acid compound is one wherein $\overline{z\ x\ y}$ is the group

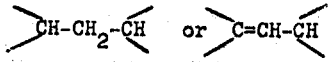

and $R_1$ is as defined in claim 1, and in which the said lysergic acid compound is employed in anhydrous form.

5. A process according to claim 3 in which the lysergic acid compound is a mixture of the 1-$R_1$-lysergic acid, 1-$R_1$-isolysergic acid and 1-$R_1$-6-methyl-$\Delta^{8,9}$-ergolene-8-carboxylic acid, wherein $R_1$ is as defined in claim 1, and in which said mixture is employed in anhydrous form.

6. A process according to claim 3 in which the lysergic acid compound is in anhydrous form, and in which the mol ratio of said lysergic acid compound: trifluoroacetic acid anhydride is 1:1 to 1.4.

7. A process according to claim 5 in which the ratio of the mixture of the 1-$R_1$-lysergic acid, 1-$R_1$-isolysergic acid and 1-$R_1$-6-methyl $\Delta^{8,9}$-ergolene-8-carboxylic acid: trifluoroacetic acid anhydride is 1:1 to 1.4.

8. A process according to claim 1 in which the trifluoroacetic acid which dissolves the lysergic acid compound in the inert solvent is generated in situ from excess trifluoroacetic acetic acid anhydride by the addition of water to the reaction mixture.

9. A process according to claim 8, in which the lysergic acid compound in one wherein $\overline{z\,x\,y}$ is the group

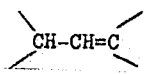

and $R_1$ is as defined in claim 1, and in which the water is added to the reaction mixture as water of hydration in the lysergic acid compound.

10. A process according to claim 9, in which the lysergic acid compound is in the form of a monohydrate, and in which the mol ratio of said lysergic acid compound: trifluoroacetic acid anhydride is 1:2 to 2.4.

11. A process according to claim 9 in which the mol ratio of the lysergic acid compound to trifluoroacetic acid anhydride is such as to form 3 mols of trifluoroacetic acid for every mol of the mixed anhydride of the lysergic acid compound with trifluoroacetic acid.

12. A process according to claim 1 in which the inert solvent is selected from acetonitrile, dimethyl formamide, dimethyl acetamide, propionitrile, N-methyl pyrrolidone, and methylene chloride or mixtures thereof.

13. A process according to claim 1, in which the mol ratio of the amine salt: mixed anhydride is 1:1.3 to 2.

14. A process in which the reaction mixture of claim 1 is maintained at a temperature of between −15° to 0°C for a period of from 15 to 100 minutes after all reactants have been added.

* * * * *